(12) United States Patent
Hasegawa

(10) Patent No.: US 9,393,751 B2
(45) Date of Patent: Jul. 19, 2016

(54) APPARATUS AND METHOD FOR PRODUCING TIRE

(75) Inventor: Takasumi Hasegawa, Hikone (JP)

(73) Assignee: BRIDGESTONE CORPORATION, Tokyo (JP)

( * ) Notice: Subject to any disclaimer, the term of this patent is extended or adjusted under 35 U.S.C. 154(b) by 443 days.

(21) Appl. No.: 13/318,680

(22) PCT Filed: May 6, 2010

(86) PCT No.: PCT/JP2010/057775
§ 371 (c)(1),
(2), (4) Date: Dec. 15, 2011

(87) PCT Pub. No.: WO2010/131598
PCT Pub. Date: Nov. 18, 2010

(65) Prior Publication Data
US 2012/0111473 A1    May 10, 2012

(30) Foreign Application Priority Data

May 11, 2009   (JP) .................................. 2009-114795

(51) Int. Cl.
*B29D 30/30*   (2006.01)
*B29C 65/00*   (2006.01)
(Continued)

(52) U.S. Cl.
CPC ........ *B29D 30/3007* (2013.01); *B29C 65/7847* (2013.01); *B29C 66/1122* (2013.01);
(Continued)

(58) Field of Classification Search
CPC ........... B29D 30/1607; B29D 30/3007; B29D 30/42; B29D 30/44; B29D 30/46; B29D 2030/1678; B29D 2030/1685; B29D 2030/3078; B29D 2030/3085; B29D 2030/4443; B29D 2030/445; B29D 2030/4456; B29D 2030/4462; B29C 66/4324; B29C 66/4322; B29C 66/4329

USPC ........ 156/133, 134, 405.1, 406.4, 406.6, 353, 156/378
See application file for complete search history.

(56) References Cited

U.S. PATENT DOCUMENTS

| | | | |
|---|---|---|---|
| 3,898,116 A * | 8/1975 | Katagiri et al. | ................ 156/134 |
| 4,769,104 A | 9/1988 | Okuyama et al. | |
| 4,857,123 A * | 8/1989 | Still | ....................... B29D 30/08 156/133 |
| 5,111,722 A | 5/1992 | Tada et al. | |

(Continued)

FOREIGN PATENT DOCUMENTS

| EP | 0 447 273 A2 | 9/1991 |
|---|---|---|
| EP | 0 518 691 A2 | 12/1992 |

(Continued)

OTHER PUBLICATIONS

Mar. 28, 2013 European Search Report issued in European Patent Application No. 10 77 4855.0.

(Continued)

*Primary Examiner* — Geoffrey L Knable
(74) *Attorney, Agent, or Firm* — Oliff PLC

(57) ABSTRACT

A tire constituting member in an unvulcanized tire having a joint portion is prevented from being triply overlapped and is wound around a body to be formed. When detecting the joint portion, the tire constituting member is cut into a length shorter than a predetermined length while excluding the joint portion. A front end and rear end portions of the wound tire constituting member are held by front and rear end holding members. The tire constituting member is extended into a predetermined length and both holding members are moved to the side of the body. The front end portion is attached to the body, a support member is rotated, the tire constituting member is wound around the body, the rear end holding member is moved to the side of the body as the tire constituting member is wound and the rear end portion is joined to the front end portion.

4 Claims, 5 Drawing Sheets

(51) Int. Cl.
   *B29C 65/78* (2006.01)
   *B29D 30/42* (2006.01)
   *B29D 30/46* (2006.01)
   *B29D 30/44* (2006.01)
   *B29L 30/00* (2006.01)

(52) U.S. Cl.
   CPC ......... *B29C66/4322* (2013.01); *B29C 66/4324* (2013.01); *B29C 66/49* (2013.01); *B29C 66/71* (2013.01); *B29C 66/72141* (2013.01); *B29C 66/73752* (2013.01); *B29C 66/92* (2013.01); *B29C 66/98* (2013.01); *B29D 30/30* (2013.01); *B29D 30/42* (2013.01); *B29D 30/44* (2013.01); *B29D 30/46* (2013.01); *B29C 66/7212* (2013.01); *B29C 2793/0081* (2013.01); *B29D 2030/3078* (2013.01); *B29D 2030/3085* (2013.01); *B29D 2030/421* (2013.01); *B29D 2030/423* (2013.01); *B29D 2030/426* (2013.01); *B29D 2030/4443* (2013.01); *B29D 2030/4456* (2013.01); *B29L 2030/00* (2013.01)

(56) References Cited

U.S. PATENT DOCUMENTS

| 5,582,664 A | 12/1996 | Sergel et al. |
| 5,904,788 A | 5/1999 | Kitajima et al. |
| 2005/0000626 A1* | 1/2005 | Auclair .................. 156/123 |

FOREIGN PATENT DOCUMENTS

| JP | 56111660 A * | 9/1981 |
| JP | 06218845 A * | 8/1994 |
| JP | A-7-40460 | 2/1995 |
| JP | A-7-232382 | 9/1995 |
| JP | A-10-146901 | 6/1998 |

OTHER PUBLICATIONS

International Preliminary Report on Patentability dated Dec. 12, 2011 issued in International Application No. PCT/JP2010/057775 (with translation).

International Search Report dated Jun. 8, 2010 issued in International Application No. PCT/JP2010/057775 (with translation).

* cited by examiner

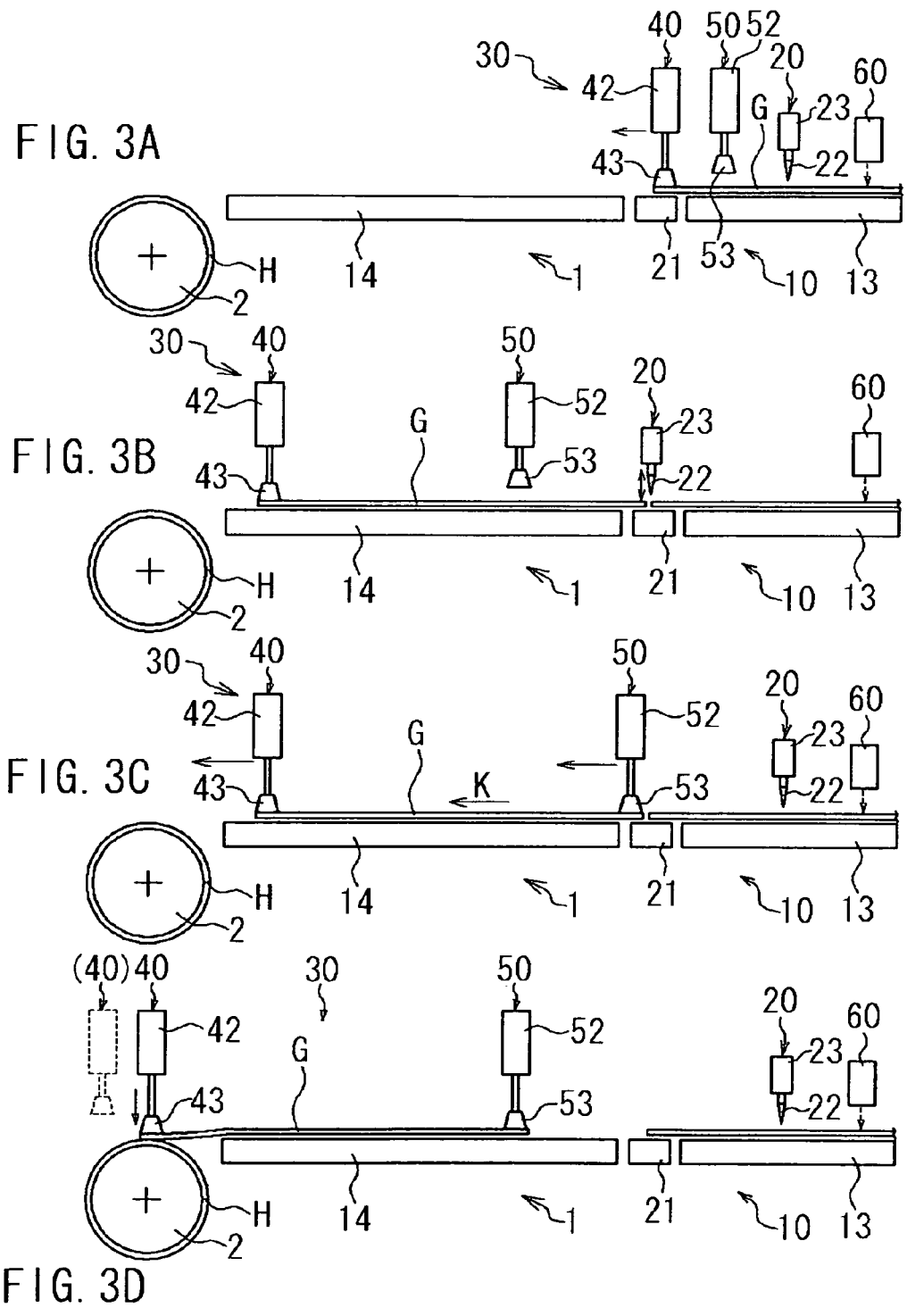

APPARATUS AND METHOD FOR PRODUCING TIRE

TECHNICAL FIELD

The present invention relates to a tire producing apparatus for forming an unvulcanized tire by winding tire constituting members around a body to be formed and to a method for producing a tire.

BACKGROUND ART

Various tires such as a pneumatic tire are generally produced by sequentially arranging tire constituting members made of unvulcanized rubber and the like around a body to be formed, forming an unvulcanized tire and then vulcanizing and molding it. Conventionally, as the above tire producing apparatus, there is known an apparatus that attaches the front end portions of tire constituting members to the outer circumference of a forming drum, that winds the tire constituting members one turn by rotating the forming drum and that forms them into a predetermined shape by joining the front end portions and the rear end portions (see patent document 1).

Incidentally, in terms of the uniformity and the like of a tire, it is necessary to accurately wind a tire constituting member around a body to be formed and thereby stabilize, each time a tire is formed, the position where the tire constituting member is arranged with respect to the body to be formed and the overlapping of end portions and to keep their variations small. In particular, at the start and end of the winding of the tire constituting member, the position where the tire constituting member is arranged with respect to the body to be formed is highly likely to be displaced from a target position, and thus it is necessary to accurately attach and arrange the front end portions and the rear end portions thereof. Hence, in a tire forming process, for example, specifications for allowable ranges of the amount of displacement of the position of the arrangement from the target position, the amount of displacement of the end portions from each other in the width direction, the amount of overlapping (the amount of joining) of the end portions and the like are set, and these specifications are used to determine whether or not they are satisfactory, with the result that the accuracy of the winding of the tire constituting member required for the performance of the tire is ensured.

On the other hand, conventionally, a tire constituting member is supplied and wound around a body to be formed, and thereafter its rear end portion is manually cut, is aligned by hand with its front end portion and is attached to the body to be formed. In this case, since it is possible not only to hold by hand the tire constituting member and easily guide it to the proper position of the arrangement but also to align and attach the position of the rear end portion with and to the position of the front end portion while finely adjusting the position of the rear end portion, it is possible to accurately arrange the tire constituting member and join the end portions, with the result that it is possible to relatively stably satisfy specifications and accuracy for the winding.

However, when the winding is required to be performed by hand, it is difficult to achieve automation of the entire tire producing process and enhance the productivity thereof, and this prevents the automation of the entire tire forming process that has been recently required. Hence, it is required to wind the tire constituting member around the body to be formed without requiring hand work while ensuring sufficient accuracy corresponding to the type of the tire constituting member and the like. In this case, it is necessary to automatically adjust the position of the arrangement of the front end portion and the rear end portion of the tire constituting member, accurately attach it to the body to be formed and achieve the overall accuracy of the winding.

Patent document 1: Japanese Unexamined Patent Application Publication No. 07-40460

SUMMARY OF THE INVENTION

In the preceding process of the tire forming process of the forming of the unvulcanized tire, as the tire constituting member, a member is used that is produced by stacking a plurality of sheet members cut to have a predetermined shape and joining them in a predetermined width and sequentially connecting them in the longitudinal direction. This type of tire constituting member has a plurality of joint portions at a predetermined interval in the longitudinal direction according to the joining of the preceding process; for example, after the production, it is wound around a roll, and a necessary length thereof is drawn out and cut and is wound around the body to be formed sequentially from the front end portion. In this case, when both ends of the tire constituting member are joined by being wound around the body to be formed, due to the joint portions of the preceding process, the members are sometimes triply overlapped.

FIGS. 6A and 6B are side views illustrating the overlapping of the tire constituting member; FIG. 6A schematically shows the tire constituting member before being wound around the body to be formed, and FIG. 6B schematically shows the tire constituting member after being wound around the body to be formed.

As shown in FIG. 6A, when a tire constituting member G is cut at a joint portion J of the preceding process at the time of the cutting before the tire constituting member G is wound around the body to be formed, portions where the member is doubly overlapped are produced at the cut end portion. When the tire constituting member G is wound around the body to be formed, as shown in FIG. 6B, at the portion where both ends are overlapped and joined, one member of one end portion and two members of the other end portion are overlapped, with the result that they are triply overlapped (a Z range in the figure) and thickness is partially increased.

With respect to this overlapping, conventionally, in order to prevent the uniformity of the tire from being reduced, after the winding of the tire constituting member G, the joint portion J is cut and removed by hand, and thus the joining of both ends of the tire constituting member is adjusted. However, in this case, as similar to the above, it is difficult to achieve automation of the tire forming process and enhance the productivity, and, since the cycle time is increased due to the interruption of the winding process, further improvement is required in order to increase the productivity.

The present invention is made to overcome the conventional problem described above; an object of the present invention is to wind, when an unvulcanized tire is formed, a tire constituting member having a joint portion around a body to be formed without requiring hand work with high accuracy while, for example, they are prevented from being triply overlapped, and to suppress the decrease in uniformity and enhance the productivity of the production of tires.

Solution to Problem

According to the present invention, there is provided a tire producing apparatus including supply means that supplies a tire constituting member having one or more joint portions along a longitudinal direction and rotating means of a body to be formed, for forming an unvulcanized tire by winding the tire constituting member around the rotating body to be formed, the apparatus comprising: detection means that detects the joint portions of the tire constituting member; cutting means that cuts the tire constituting member into a length wound around the body to be formed and that cuts, when one of the joint portions is detected in a vicinity of a cutting position, the tire constituting member into a length shorter than the wound length while excluding the joint portion; extension means that extends, into the wound length, the tire constituting member which has been cut into the short length; front end holding attaching means and rear end holding attaching means that respectively hold and attach a front end portion and a rear end portion of the wound tire constituting member to the body to be formed; and movement means that moves the rear end holding attaching means holding the rear end portion of the tire constituting member toward the body to be formed up to a position where the rear end portion is attached as the tire constituting member having the front end portion attached to the body to be formed is wound around the body to be formed.

According to the present invention, there is also provided a method for producing a tire including the step of cutting a tire constituting member having one or more joint portions along a longitudinal direction into a length wound around a body to be formed, for forming an unvulcanized tire by winding the cut tire constituting member around a rotating body to be formed, the method comprising the steps of: detecting the joint portions of the tire constituting member; cutting, when one of the joint portions is detected in a vicinity of a position where the tire constituting member is cut, the tire constituting member into a length shorter than the wound length while excluding the joint portion; extending, into the wound length, the tire constituting member which has been cut into the short length; holding and attaching a front end portion of the wound tire constituting member to the body to be formed; rotating the body to be formed to which the front end portion of the tire constituting member has been attached and winding the tire constituting member around the body to be formed; holding the rear end portion of the wound tire constituting member and moving it toward the body to be formed as the tire constituting member as the tire constituting member is wound around the body to be formed; and attaching, to the body to be formed, the rear end portion of the tire constituting member which has been moved up to the body to be formed.

Advantageous Effects of Invention

According to the present invention, it is possible to wind, when an unvulcanized tire is formed, a tire constituting member having a joint portion around a body to be formed without requiring hand work with high accuracy while, for example, they are prevented from being overlapped three times, and to suppress the decrease in uniformity and enhance the productivity of the production of tires.

BRIEF DESCRIPTION OF THE DRAWINGS

FIGS. 3A to 3D are side views schematically showing a procedure of winding a tire constituting member in the main portions of the tire producing apparatus;

DESCRIPTION OF EMBODIMENT

An embodiment of a tire producing apparatus and a method of producing a tire according to the present invention will be described below with reference to accompanying drawings.

The tire producing apparatus of the present embodiment is a forming device that supplies and winds a tire constituting member around a rotating body to be formed and that forms (produces) an unvulcanized tire of predetermined shape and structure. In this case, in the present embodiment, the tire constituting member having one or more (here, a plurality of) joint portions in the longitudinal direction is supplied to the body to be formed, the tire constituting member is automatically wound around the body to be formed and various types of unvulcanized tires are formed.

Figure 6A:
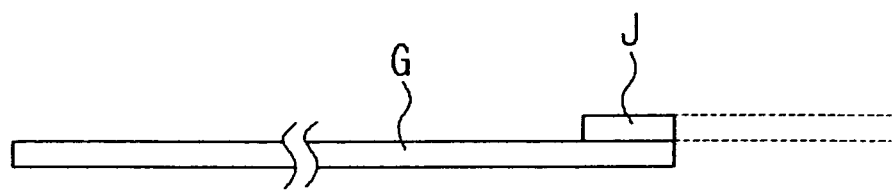
FIGS. 6A and 6B are side views illustrating the overlapping of a conventional tire constituting member.
Figure 6B:
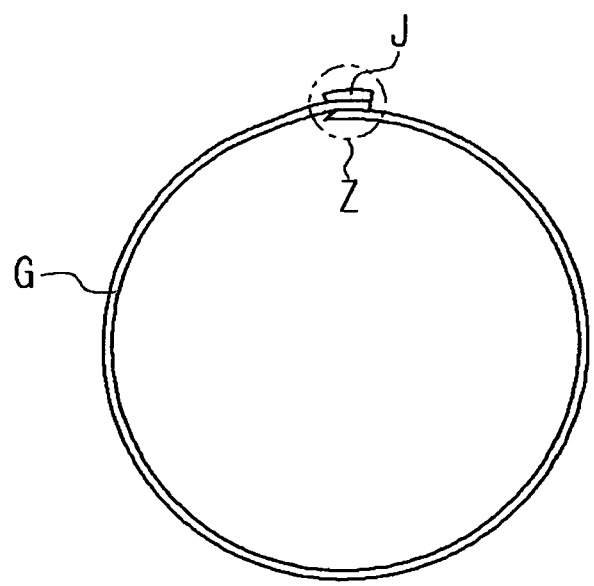

For example, as described above (see FIGS. 6A and 6B), the tire constituting member is formed to have a long length by previously joining a plurality of members and sequentially connecting them in the longitudinal direction, and the tire constituting member is cut in a tire forming process for use. Here, joint portions J of a tire constituting member G are formed by stacking end portions of adjacent members in a predetermined width, are formed parallel to or inclined against the width direction of the tire constituting member G (hereinafter simply referred to as the width direction) and are formed at a predetermined interval along the longitudinal direction. As an example of the tire constituting member G, a description will be given of a sheet-shaped member (organic insert) that is produced by obliquely cutting and joining a rubber coated cord which has a plurality of organic fiber cords aligned and which is coated with an unvulcanized rubber such that the organic fiber cords are inclined at a predetermined angle (here, 45°) with respect to the longitudinal direction and by joining them. Hence, this tire constituting member G has the joint portion J of the predetermined width extending inclined against the width direction, and the internal organic fiber cords are arranged parallel to the joint portion J and are cut parallel to the joint portion J.

Figure 1:
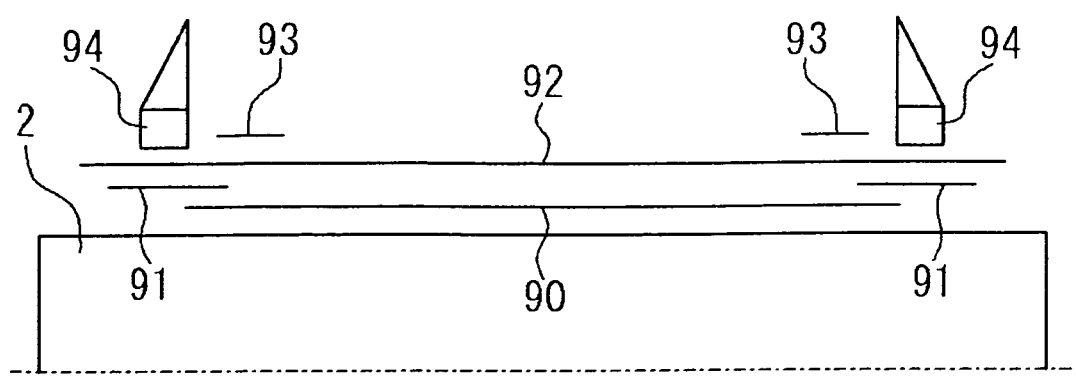
FIG. 1 is a cross-sectional view illustrating a tire forming procedure according to the present embodiment.

FIG. 1 is a cross-sectional view illustrating the tire forming procedure according to the present embodiment; FIG. 1 schematically shows each cross section viewed in a direction corresponding to the radius direction of the tire.

When the tire is formed, as shown in the figure, first, an inner liner 90, a pair of canvas chafers 91 that is arranged at both edge portions thereof and a carcass ply 92 are sequentially wound on the outer circumference of a support member 2. Then, a pair of reinforcing members 93 formed with an organic insert is wound around a predetermined position on the side of both edge portions of the carcass ply 92, a pair of beads 94 is crimped on both sides thereof and a cylindrical carcass band is formed. Thereafter, the carcass band taken out of the support member 2 is shaped with another forming drum, and an unvulcanized tire is formed by stacking, on its outer surface, tire constituting members such as a belt, a spiral layer, a base tread, a cap tread, a side rubber and a rubber chafer. In the present embodiment, at the time of the forming, the predetermined tire constituting members G (here, the reinforcing members 93) are wound around the body to be formed with the tire producing apparatus that will be described below.

Figure 2:
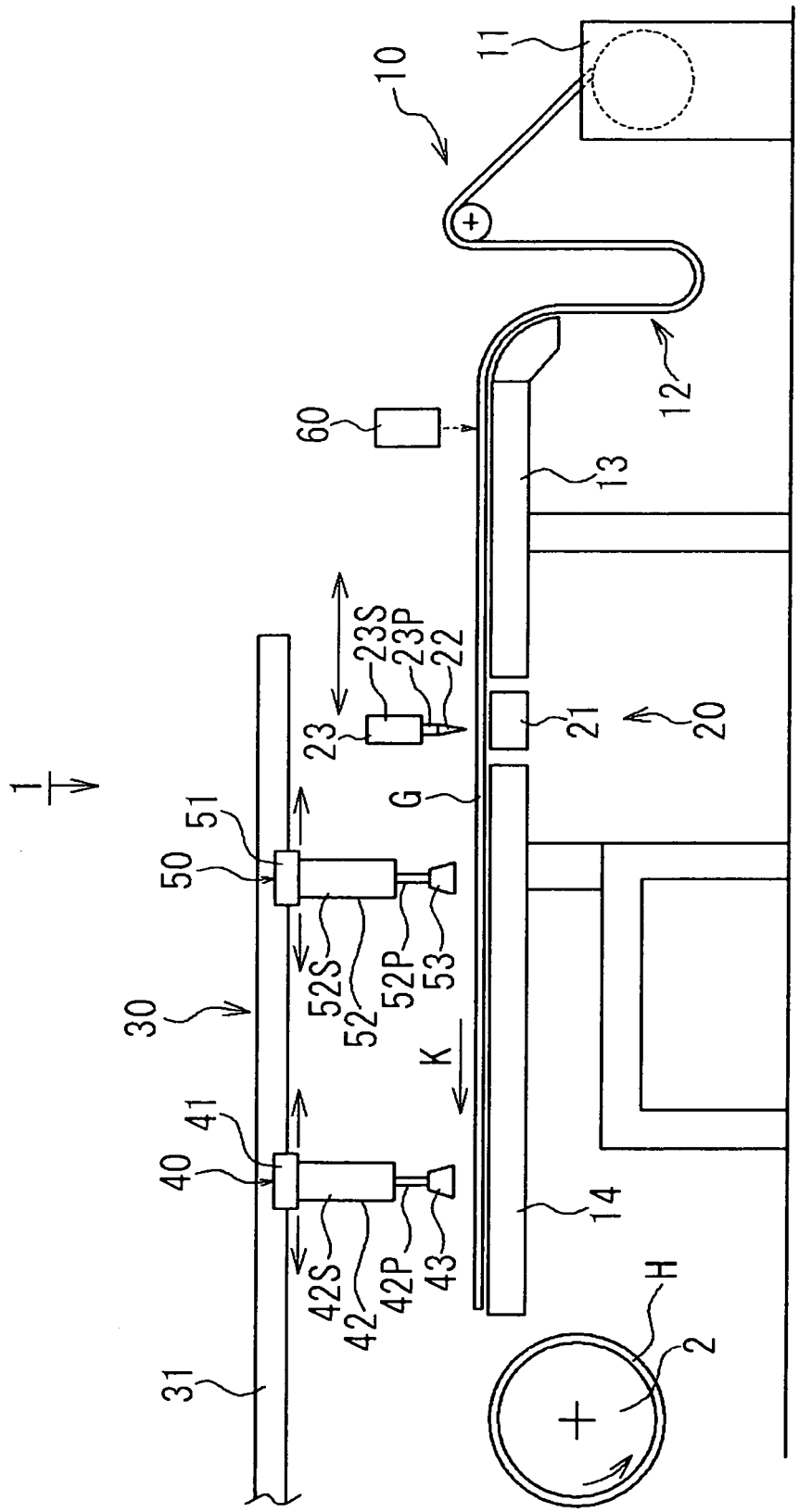
FIG. 2 is a side view schematically showing the configuration of main portions of a tire producing apparatus according to the present embodiment.

FIG. 2 is a side view schematically showing the configuration of main portions of the tire producing apparatus according to the present invention.

As shown in the figure, the tire producing apparatus 1 includes the support member 2, supply means 10 that supplies the tire constituting member G to the support member 2, cutting means 20 that cuts the tire constituting member G and a winding device 30 of the tire constituting member G arranged thereabove.

The support member 2 is support means that rotatably supports, when the unvulcanized tire is formed, a body to be formed H around the axial line, and is formed with, for example, a forming drum which is cylindrical or whose cross section is toroidal-shaped or a rigid core having an outer shape corresponding to the shape of the inner surface of the unvulcanized tire to be formed. Here, the support member 2 is formed with a cylindrical forming drum that can rotate around the axis line, the tire constituting members G are subjected to sequential winding, arrangement or the like on the side of the outer circumference to form the body to be formed H, which is retained concentrically. The support member 2 is rotated and driven with a drive source such as a motor and rotation means (not shown) including a transmission mechanism of the power of the rotation or the like, and the body to be formed H is rotated around the axis line at a predetermined speed and is stopped at an arbitrary rotational angle.

Here, the body to be formed H is an unvulcanized tire or a tire intermediate that is in the process of forming and that is composed of the support member 2 and at least one tire constituting member arranged around the support member 2; the tire constituting member G is wound in a predetermined stage of the forming of the unvulcanized tire. The body to be formed H may be formed with the rigid core described above or only the forming drum which is cylindrical or whose cross section is toroidal-shaped after being expanded and deformed or may be formed with a base tire obtained by removing a tread from the unvulcanized tire; its configuration is not particularly limited as long as it functions as a support member around which the tire constituting member G is supplied and wound.

The supply means 10 includes a stock portion 11 for the long tire constituting member G (small wound member) wound around a roll; the tire constituting member G is pulled out of it, and is supplied (arrow K) to the body to be formed H as the winding operation around the body to be formed H is performed. The supply means 10 includes: a festoon 12 that adjusts the amount of supply by bending down the tire constituting member G pulled out of the stock portion 11 such that the tire constituting member G is U-shaped; and first and second transfer conveyers 13 and 14 where a plurality of rotatable transfer rolls (not shown) is provided. The supply means 10 sequentially slides and transfers, on the first and second transfer conveyers 13 and 14, the tire constituting member G pulled through the festoon 12, to move it in the longitudinal direction. In this case, when the tire constituting member G is wound around the roll together with a liner such as a poly sheet, and the liner is present between the tire constituting members G, the supply means 10 separates the liner and then supplies and transfers the tire constituting member G.

In the present embodiment, the second transfer conveyer 14 is positioned between the first transfer conveyer 13 and the support member 2, and is arranged along the path of the movement (supply) of the tire constituting member G over a distance longer than a length wound around the body to be formed H. Consequently, the entire tire constituting member G that is previously cut into the length wound therearound can be placed on the second transfer conveyer 14 in a state where it extends linearly. With the second transfer conveyer 14, the supply means 10 linearly moves the tire constituting member G in the longitudinal direction to the support member 2, guides it toward a predetermined winding position of the body to be formed H and continuously supplies it to the body to be formed H sequentially from the front end portion.

The cutting means 20 includes an anvil 21 provided between the transfer conveyers 13 and 14, a cutter 22 arranged thereabove and a piston-cylinder mechanism 23 attached with the cutter 22; the tire constituting member G is cut on the anvil 21 with the cutter 22. The anvil 21 is arranged below the tire constituting member G to be supplied, does not prevent the movement of the tire constituting member G while the tire constituting member G is being supplied and supports the tire constituting member G from the side of the lower surface when the tire constituting member G is cut. As a piston rod 23P of the piston-cylinder mechanism 23 moves into and out of a cylinder 23S, the cutter 22 approaches and separates from the anvil 21 from above, and makes contact with the tire constituting member G and cuts it into a predetermined shape.

Moreover, the cutting means 20 includes a first movement mechanism (not shown) formed with, for example, the piston-cylinder mechanism which moves the piston-cylinder mechanism 23 above the first transfer conveyer 13 along the transfer direction of the tire constituting member G. With the first movement mechanism, the cutting means 20 moves the piston-cylinder mechanism 23 and the cutter 22 between a position where above the anvil 21 the tire constituting member G is cut and a standby position above the first transfer conveyer 13. The cutting means 20 further includes a second movement mechanism (not shown) of moving the piston-cylinder mechanism either linearly in the width direction of the tire constituting member G or obliquely at a predetermined angle (here, moving it obliquely). The cutting means 20 uses, while the cutter 22 is pressed onto the tire constituting member G, the second movement mechanism to move the piston-cylinder mechanism 23, moves the cutter 22 sideway in the width direction along the position where the tire constituting member G needs to be cut and cuts the tire constituting member G with the cutter 22. Thus, the cutting means 20 cuts, into the length wound around the body to be formed H, the tire constituting member G on the second transfer conveyer 14 before being wound, and forms it into predetermined shape and length.

The winding device 30 includes a guide rail 31 arranged above the transfer conveyers 13 and 14 and front end holding attaching means 40 and rear end holding attaching means 50 of the tire constituting member G; the winding device 30 holds the front end portion and the rear end portion of the tire constituting member G in the longitudinal direction by each of the holding attaching means 40 and 50, and attaches them to the body to be formed H. The guide rail 31 is arranged in a direction perpendicular to the direction of the axis line of the support member 2 and parallel to the second transfer conveyer 14, and is put over so as to linearly extend from above the first transfer conveyer 13 and beyond above the support member 2. The front end holding attaching means 40 is attached to the guide rail 31 at the side of the support member 2 and the rear end holding attaching means 50 is attached to the guide rail 31 at the side of the cutting means 20 such that they can move.

The holding attaching means 40 and 50 respectively includes: sliders 41 and 51 that slide along the lower surface of the guide rail 31 and that can move in the longitudinal direction; piston-cylinder mechanisms 42 and 52 that are fixed to the lower surface to point downwardly; and suction pads 43 and 53 that are attached to the front end (lower end) of piston rods 42P and 52P. The winding device 30 further includes front end and rear end movement means (not shown) in which, for example, a rotary member that is rotated by an electric motor is provided in the sliders 41 and 51 and which move the sliders 41 and 51, for example, and transfer the sliders 41 and 51 along the guide rail 31. The winding device 30 uses these movement means to individually move the sliders 41 and 51 at predetermined speeds, and determines movement distances from the number of revolutions of the electric motor, or detects their positions with a sensor and thereby stops the sliders 41 and 51 at predetermined positions of the guide rail 31. In these positions, the holding attaching means 40 and 50 operate the piston-cylinder mechanisms 42 and 52 to move the piston rods 42P and 52P into and out of cylinders 42S and 52S, and move the suction pads 43 and 53 in an upward and downward direction to make contact with and separate from the upper surface of the tire constituting member G.

The suction pads 43 and 53 are formed of flexibly deformable elastic material such as rubber, and are trumpet-shaped such that, as they extend toward an open end (here, the lower end), their diameter is increased; the suction pads 43 and 53 are connected through an air hose or a switching valve to air discharge means (not shown) such as a vacuum pump. The suction pads 43 and 53 use the air discharge means to discharge air between the trumpet-shaped inside and the tire constituting member G in contact with the open end, suck the tire constituting member G at a predetermined suction force by decreasing the internal pressure, stop the discharging of the air to restore the pressure and thereby stop the suction of the tire constituting member G. As described above, the suction pads 43 and 53 form suction holding means for the tire constituting member G, and suck and hold the tire constituting member G from above such that the tire constituting member G is detachable.

The winding device 30 lowers the suction pads 43 and 53 of the front end holding attaching means 40 and the rear end holding attaching means 50, makes them in contact with predetermined positions of the tire constituting member G and holds, before the cut tire constituting member G is wound, the winding front and rear end portions. In this state, the sliders 41 and 51 are moved, and thus the holding attaching means 40 and 50 and the suction pads 43 and 53 are sequentially moved, in each stage of the winding operation of the tire constituting member G, which will be described later, up to above the body to be formed H and are lowered toward the body to be formed H. Thus, the end portions of the tire constituting member G are pressed and attached to a predetermined position on the outer circumference of the body to be formed H, and, for example, both end portions of the tire constituting member G are joined.

The tire producing apparatus 1 also uses the front end holding attaching means 40 as pulling-out means for holding the front end portion of the tire constituting member G that has not been cut and pulling out it on the second transfer conveyer 14, moves the front end holding attaching means 40 from the side of the cutting means 20 to the side of the support member 2 and pulls out a predetermined length of the tire constituting member G. The tire constituting member G that has been pulled out is cut with the cutting means 20, the cut rear end portion on the anvil 21 is held with the rear end holding attaching means 50, then both the end holding attaching means 40 and 50 are moved and the front end portion of the tire constituting member G is attached to the body to be formed H with the front end holding attaching means 40.

Since, in the present embodiment, the tire constituting member G is held over the entire width direction, a plurality of suction pads 43 and 53 is arranged at equal distance along such a direction and is attached through coupling members (not shown) to the lower ends of the piston rods 42P and 52P. Alternatively, each of the sliders 41 and 51 is formed to have a width greater than that of the second transfer conveyer 14, and is arranged over the entire width direction (in the figure, in the front and rear direction of the plane of the paper), and a plurality of piston-cylinder mechanisms 42 and 52 having the suction pads 43 and 53 on the lower surface is arranged at equal distance. Hence, the piston-cylinder mechanisms 42 and 52 are operated, the suction pads 43 and 53 are made in contact with the tire constituting member G and, with a plurality of suction pads 43 and 53 in contact with the upper surface thereof, the end portions of the tire constituting member G are uniformly sucked and held over the entire width direction.

They are arranged in a direction corresponding to the shape of the cut end portions so that a plurality of suction pads 43 and 53 holds the tire constituting member G along the end portions thereof. In other words, when, for example, the end portions of the tire constituting member G are parallel to the width direction, a plurality of suction pads 43 and 53 is arranged linearly along the width direction whereas, when the end portions are obliquely placed, they are arranged obliquely in the same direction (here, are arranged obliquely). The winding device 30 of the present embodiment, for example, holds the end portions at a plurality of positions as described above and moves them in the following description, the suction pads 43 and 53 refer to a plurality of suction pads 43 and 53 that, for example, sucks, holds and moves the end portions of the tire constituting member G at the same time.

Moreover, the tire producing apparatus 1 includes detection means 60 that detects the joint portion J of the tire constituting member G; the detection means 60 is arranged on the upstream side in the direction of the supply with respect to the position where the tire constituting member G is cut. The tire producing apparatus 1 detects, with this detection means 60, the joint portion J of the tire constituting member G which has not been cut, and grasps the position of the tire constituting member G in the longitudinal direction. As the detection means 60, for example, a laser displacement sensor that can continuously measure the displacement of the surface of the tire constituting member G in a noncontact manner or an ultrasonic distance sensor that can measure a distance can be used; the detection means 60 is arranged such that its measurement portion faces a predetermined position of the tire constituting member G and is a predetermined distance apart from it. Here, the detection means 60 has a laser displacement sensor, and the laser displacement sensor is arranged above the first transfer conveyer 13 to face downwardly and continuously measures the displacement of the upper surface of the tire constituting member G being transferred. In this case, the joint portion J has a thickness greater than those of the other portions because the members overlap each other, and hence protrudes more than the other surfaces. Therefore, when, based on the result of the measurement of displacement, the amount of displacement is measured to be larger than the predetermined reference amount of displacement, the range of the measurement is determined to be the joint portion J, and thus the joint portion J is detected.

A procedure of and an operation of using the tire producing apparatus 1 to wind the tire constituting member G around the body to be formed H, to form the unvulcanized tire and to produce the tire will now be described. The following procedure and the like are performed by control through a control device (not shown) and by coordinately operating individual portions of the device at a predetermined timing and under predetermined conditions. This control device is formed with a computer that includes, for example, a microprocessor (MPU), a ROM (read only memory) storing various programs and a RAM (random access memory) temporarily storing data directly accessed by the MPU; the individual portions of the device are connected through connection means thereto. In this way, the control device exchanges control signals and various types of data with the individual portions of the device, and makes them perform operations related to the forming of the tire.

FIGS. 3A to 3D are side views schematically showing the procedure of winding the tire constituting member G, main portions of the tire producing apparatus 1 and the states of winding stages in a sequential manner.

In the tire producing apparatus 1, first, the holding attaching means 40 and 50 are moved (see FIG. 3A), the front end holding attaching means 40 is positioned above the front end portion of the cut tire constituting member G on the anvil 21, the suction pad 43 is lowered and the front end portion of the tire constituting member G is sucked and held. Then, while the joint portion J of the tire constituting member G is being detected with the detection means 60, the front end holding attaching means 40 is moved toward the support member 2, and the tire constituting member G is pulled out into a predetermined length along the second transfer conveyer 14 (see FIG. 3B). When, in this way, the length from the front end of the tire constituting member G to the position where the cutting is performed with the cutting means 20 becomes a predetermined wound length, the front end holding attaching means 40 is stopped.

Then, the cutter 22 of the cutting means 20 is moved from the standby position to the position where the tire constituting member G is cut, the cutting means 20 is operated to cut with the cutter 22 the tire constituting member G pulled out and the tire constituting member G is formed into the length wound around the body to be formed H including the amount of joining the end portions. Here, as described above, one or more joint portions J (here, a plurality of joint portions J spaced regularly), and, if the joint portions J (see FIGS. 6A and 6B) are positioned in the vicinity of the position where the tire constituting member G is cut, when the end portions are joined, three members are overlapped. In the present embodiment, in order to prevent this overlapping, when the joint portion J is detected in the vicinity of the position where the tire constituting member G is cut, the cutting means 20 cuts, at a position other than the joint portion J, the tire constituting member G into a length shorter than a predetermined wound length.

Figure 4A:
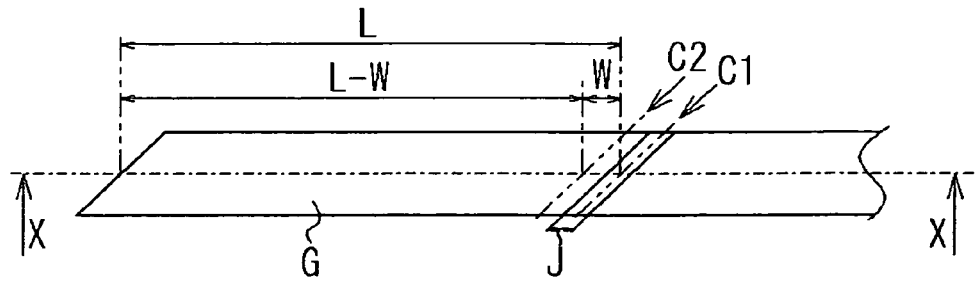
FIGS. 4A and 4B are schematic diagrams illustrating the cutting of the tire constituting member.
Figure 4B:
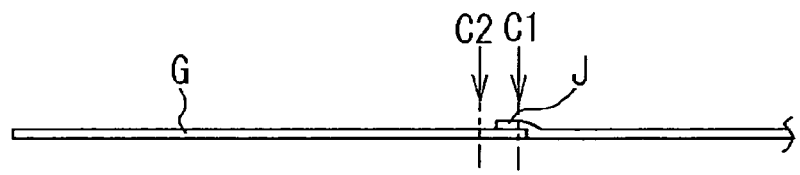

FIGS. 4A and 4B are schematic diagrams illustrating the cutting of the tire constituting member G; FIG. 4A is a plan view when the tire constituting member G is seen from above, and FIG. 4B is a cross-sectional view taken along line X-X of FIG. 4A.

In the tire producing apparatus 1, the control device calculates, based on the result of the detection of the joint portion J by the detection means 60 and the movement distance of the tire constituting member G, the position of the joint portion J when the tire constituting member G is cut. The control device also determines, from the result of the calculation of the position, whether or not, as a result of the movement of the tire constituting member G, the joint portion J is stopped at the position where the joint portion J is cut by the cutting means 20 and the tire constituting member G is cut at the joint portion J. Hence, if the tire constituting member G is determined not to be cut at the joint portion J, the tire producing apparatus 1 cuts the tire constituting member G into a predetermined normal wound length (a length along the longitudinal direction) L (the arrow C1 of FIGS. 4A and 4B). Here, in the tire producing apparatus 1, the cutting means 20 inclines the tire constituting member G in the same direction as the joint portion J, and cuts it such that the joint portion J is parallel to the cut end.

On the other hand, if the tire constituting member G is determined to be cut at the joint portion J, the tire producing apparatus 1 reduces the movement distance of the front end holding attaching means 40 for pulling out the tire constituting member G as compared with the normal case, and thereby reduces the length of the tire constituting member G that is pulled out. In this state, the cutting means 20 is operated, and the tire constituting member G is cut into a length (L−W) a predetermined length W shorter than the normal wound length L (the arrow L2 of FIGS. 4A and 4B). In this way, when the joint portion J is detected in the vicinity of the position where the tire constituting member G is cut, the tire producing apparatus 1 changes the cutting position to a position before the joint portion J such that the joint portion J deviates from the rear end portion of the tire constituting member G, with the result that the tire constituting member G is cut into a length shorter than the predetermined wound length L. Here, alternatively, the front end holding attaching means 40 pulls out the same predetermined length of the tire constituting member G as that pulled out when the joint portion J is not detected, then returns to the direction opposite the direction in which the tire constituting member G is pulled out and cuts it into the length shorter than the predetermined wound length L.

In the present invention, the vicinity of the position where the tire constituting member G is cut refers to the position where the cutting means 20 actually performs the cutting in addition to the vicinity thereof, and includes the range in which the end portions overlap each other when the tire constituting member G is wound around the body to be formed H and the end portions are joined. Hence, in this cut position vicinity, a distance (a predetermined distance equal to or greater than the amount of jointing including the error of the joining of the end portions) corresponding to a width (the amount of jointing) where the end portions of the tire constituting member G overlap each other is previously set as a distance from the position where the cutting means 20 performs the cutting. As a length W when the tire constituting member G is cut short, a length is set such that the joint portion J is reliably prevented from being present in the rear end portion of the cut tire constituting member G and that the joint portion J is not left in the rear end portion. Here, as the length W, a length equal to or greater than at least the width of the joint portion J is set according to the width of the joint portion J and the amount of jointing described above; for example, a length equal to or greater than the width of the joint portion J and twice or more as great as the amount of jointing is set.

After the tire constituting member G is cut as described above, the tire producing apparatus 1 returns the cutter 22, that is, the cutting means 20 (see FIG. 3C) to the standby position. The rear end holding attaching means 50 is moved to above the cut rear end portion of the tire constituting member G, the suction pad 53 is lowered and the rear end portion of the tire constituting member G is sucked and held. As described above, the suction pads 43 and 53 suck and hold the front end portion and the rear end portion of the tire constituting member G such that they are detachable, and both the end holding attaching means 40 and 50 are moved in synchronization with each other at the same speed toward the support member 2. Thus, the entire tire constituting member G is moved in the longitudinal direction (in the figure, in the leftward direction) K, and, when the held front end portion is moved up to above a predetermined position of the body to be formed H to which the front end portion is attached, both the end holding attaching means 40 and 50 are stopped (see FIG. 3D).

In the tire producing apparatus 1, the wound front end portion of the tire constituting member G is held as described above, and the front end holding attaching means 40 moves the held front end portion up to the position of the body to be formed H to which the front end portion is attached, and is attached to the predetermined position of the body to be formed H. Specifically, the winding device 30 lowers the suction pad 43 of the front end holding attaching means 40, presses it onto the body to be formed H of the tire constituting member G and crimps the front end portion sucked and held onto the body to be formed H. Then, the suction of the tire constituting member G by the suction pad 43 is stopped, the suction pad 43 is raised and the front end holding attaching means 40 is moved up to the opposite side of the support member 2 and is stopped in the standby position (indicated by broken lines of FIG. 3D).

Figure 5A:
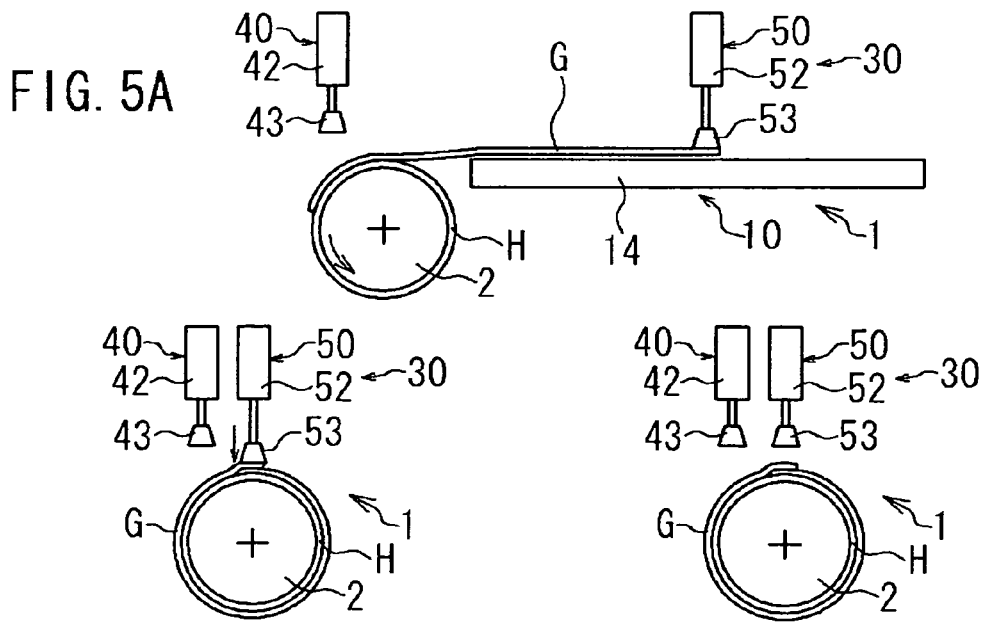
FIGS. 5A to 5C are side views schematically showing the procedure of winding the tire constituting member in the main portions of the tire producing apparatus.
Figure 5B:
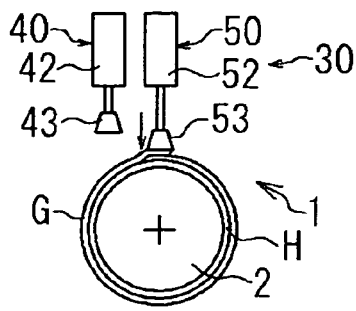
Figure 5C:
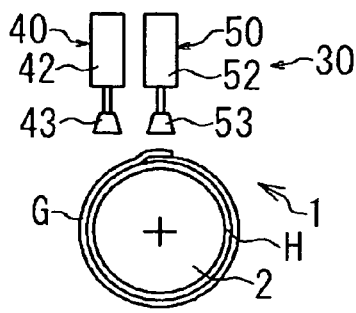

FIGS. 5A to 5C are side views schematically showing the procedure of winding the tire constituting member G after the front end portion is attached in the main portions of the tire producing apparatus 1.

Then, the tire producing apparatus 1 rotates the support member 2 to which the front end portion of the tire constituting member G is attached and the body to be formed H (see FIG. 5A) at a predetermined speed around the axial line, and sequentially winds it, from the front end portion, at the winding position of the body to be formed H while moving the tire constituting member G. Here, while the wound rear end portion of the tire constituting member G is being held, the rear end holding attaching means 50 is moved by the rear end movement means described above toward the body to be formed H as the tire constituting member G is wound around the body to be formed H. Thus, the held rear end portion of the tire constituting member G is moved to the side of the body to be formed H in synchronization with the winding at a predetermined speed corresponding to the rotational speed (the winding speed) of the support member 2, and is moved up to the preset position where the rear end portion is attached.

Here, at the time of the movement, the rear end holding attaching means 50 is moved by the rear end movement means while a tension acting in the longitudinal direction is added to the tire constituting member G before the winding between the rear end holding attaching means 50 (the held rear end portion of the tire constituting member G) and the body to be formed H. As described above, the rear end portion is moved while the position of the held rear end portion is being controlled and the predetermined tension is being added to the tire constituting member G, the support member 2 is rotated 360 degrees and the tire constituting member G is wound around the outer circumference of the body to be formed H one turn. Then, the rotation of the support member 2 and the movement of the rear end holding attaching means 50 are stopped (see FIG. 5B), the suction pad 53 is lowered, the tire constituting member G is pressed onto the body to be formed H and the held rear end portion is crimped onto the body to be formed H. Thus, the rear end portion of the tire constituting member G that has been moved up to the body to be formed H is attached to the predetermined position of the body to be formed H while the position is being controlled, and is made to overlap the front end portion that has first been attached, and thus they are joined. Thereafter, the suction of the tire constituting member G by the suction pad 53 is stopped, and the suction pad 53 is raised (see FIG. 5C), with the result that the winding of one tire constituting member G is completed.

However, when the tire constituting member G is cut into a length shorter than the wound length L, the tire producing apparatus 1 performs a step of extending the tire constituting member G to the wound length L. Here, when the tire constituting member G that has been cut into the shorter length is wound around the body to be formed H, the rotational speed of the body to be formed H is increased as compared with the normal speed or the movement speed of the rear end holding attaching means 50 is decreased as compared with the normal case, and the difference between those speeds is used to extend and deform the tire constituting member G. In other words, while the tire constituting member G is being wound, with respect to the movement speed of the rear end holding attaching means 50, the rotational circumferential speed (the circumferential-direction speed on the outer circumferential surface around which the tire constituting member G is wound) is relatively increased. Thus, a tension acting in the longitudinal direction is exerted on the tire constituting member G between rear end holding attaching means 50 and the body to be formed H, the tire constituting member G is extended in the longitudinal direction and is deformed and the entire length is extended into the predetermined wound length L. Here, the difference between those speeds is set according to the wound length L, the length W (see FIGS. 4A and 4B) when the tire constituting member G is cut into a shorter length and the like such that, when the winding is completed, the length of the tire constituting member G becomes L, and that both end portions are overlapped at a predetermined amount of joint.

The tire producing apparatus 1 likewise winds and attaches one or a plurality of cut tire constituting members G around and to the predetermined position of the rotating body to be formed H in a predetermined sequence, and, for example, combines it with another tire constituting member, and thereby forms the unvulcanized tire. Then, the formed unvulcanized tire is vulcanized and molded, and thus a tire such as a pneumatic tire is produced.

As described above, in the present embodiment, the tire constituting member G is previously cut, the front end portion and the rear end portion are held, the front end portion is attached and wound to and around the body to be formed H and the held rear end portion of the tire constituting member G is moved, according to the winding, up to the position where the rear end portion is attached to the body to be formed H. Hence, the tire constituting member G can be accurately and automatically wound over the entire longitudinal direction in the same state while the displacement of the position, meandering and the like are being reduced, and the positions of the front end portion and the rear end portion in particular can be adjusted, accurately attached and arranged on the body to be formed H. Thus, it is possible to stabilize, each time a tire is formed, the position where the tire constituting member G is arranged with respect to the body to be formed H and the overlapping of the end portions and to keep their variations small; it is possible to stably acquire specifications in which the position of the arrangement, the amount of displacement of the stage, the amount of joint and the like described above are required and the accuracy of the winding. As described above, since, in the tire producing apparatus 1, the arrangement of the tire constituting member G and the joining of the end portions can be accurately and automatically performed without requiring hand work, the productivity of the tire forming process can be enhanced, and the uniformity of the tire can also be enhanced.

Here, when the joint portion J is detected in the vicinity of the position where the tire constituting member G is cut, the tire constituting member G is cut short such that the joint portion J is excluded. Hence, in the tire constituting member G that has been wound, the members are prevented from being overlapped triply, the thickness of the tire constituting member G is prevented from being partially increased, and thus it is possible to reduce the decrease in the uniformity of the tire. Furthermore, since the tire constituting member G that has been cut short is extended into the wound length L and is wound, it is unnecessary to perform cutting and reworking by hand, and it is possible to acquire the accurate amount of jointing of the end portions of the tire constituting member G. Consequently, even when the tire constituting member G having the joint portion J is wound, the tire forming process is automated to allow the productivity to be enhanced, and, since the winding process is performed without being interrupted and thus the cycle time can also be reduced, it is possible to further enhance the productivity. Moreover, the discarding of the tire constituting member G resulting from the cutting performed by hand after the winding is unnecessary, it is possible to reduce rubber scrap and the facility is prevented from being complicated, with the result that it is possible not only to reduce the increase in installation cost but also to prevent the preservation of the facility from being reduced.

Hence, according to the present embodiment, it is possible not only to highly accurately wind, when the unvulcanized tire is formed, the tire constituting member G having the joint portion J around the body to be formed H without requiring hand work while preventing the members from being triply overlapped but also to reduce the decrease in uniformity and enhance the productivity of the production of the tire. Moreover, when the rear end portion of the tire constituting member G is moved while a predetermined tension is being applied to the tire constituting member G between the rear end portion and the body to be formed H, it is possible to prevent the displacement of the tire constituting member G to be wound around the body to be formed H. At the same time, since the tire constituting member G is wound while the tension of the tire constituting member G is being maintained in the longitudinal direction, for example, the tire constituting member G is prevented from being partially extended and is wound more uniformly as a whole. Consequently, it is possible to reduce variations in the length of the tire constituting member G at the time of the winding and to more accurately arrange the rear end portion in the present position where the rear end portion is attached.

With the tire producing apparatus 1, it is possible to wind, around the body to be formed H, the canvas chafer 91, a flipper, a slim high bead filler sheet, a belt or the like other than the reinforcing member 93 (see FIG. 1) in the same manner as described above. However, as described in the present embodiment, the tire constituting member G (for example, an organic insert) that has the joint portion J inclined with respect to the width direction and that is cut while being inclined with respect to that direction has difficulty performing the joining highly accuracy as compared with the tire constituting member G whose joint portion J is parallel to the width direction. Hence, the present invention is suitable for winding the tire constituting member G having the inclined joint portion J, and it is possible to effectively enhance the accuracy of the joining.

Although, in the present embodiment, the tire constituting member G that has been cut short is extended into the wound length L by using the difference in speed between the rear end holding attaching means 50 and the body to be formed H, this extending means may be formed with, for example, both the holding attaching means 40 and 50. In this case, the end portions of the tire constituting member G are linearly held by the front end holding attaching means 40 and the rear end holding attaching means 50 (see FIG. 3C), before being wound around the body to be formed H, the front end holding attaching means 40 and the rear end holding attaching means 50 are separated from each other only by the length described above (see FIGS. 4A and 4B) (or a length that corresponds to the resilience of rubber and that is equal to or more than W). Thus, the end portions are separated from each other, the tire constituting member G therebetween is pulled, the tension is exerted in the longitudinal direction, the tire constituting member G is pulled and extended only by the length W and deformed and its total length is extended into the wound length L.

Although, in the tire producing apparatus 1, the tire constituting member G is sucked and held by the suction pads 43 and 53, the ends of the tire constituting member G may be held by another holding means such as holding means like a robot hand for catching and holding both surfaces in the thickness direction. The end portions of the tire constituting member G may be attached by a method other than crimping in which, for example, the holding of the end portions is stopped with the end portions brought close to the attaching position of the body to be formed H such that displacements and variations are minimized, and in which the end portions are dropped toward the body to be formed H and are attached. However, when, as in the tire producing apparatus 1, the tire constituting member G is sucked and held by the suction holding means such as the suction pads 43 and 53 such that the tire constituting member G is detachable, after the end portions are attached, it is possible to easily stop the holding while preventing the displacement from the attaching position, and thus it is possible to further enhance the accuracy of the attaching. Furthermore, by pressing and crimping the sucked end portions onto the body to be formed H, it is possible to firmly and accurately attach the end portions.

Although, in the present embodiment, the tire constituting member G is cut and then the rear end portion is held, even if the tire constituting member G is held otherwise until being wound around the body to be formed H, that is, for example, the rear end portion is held and is then cut, the same effects as described above can be obtained. Moreover, the tire producing apparatus 1 can be used for forming various tires before being vulcanized such as an unvulcanized recapped tire that is formed by newly winding a belt, a tread rubber and the like, other than an unprocessed tire (green tire). Hence, the unvulcanized tire that is formed in the present invention includes not only an unprocessed tire but also various tires such as a recapped tire that are formed by winding the tire constituting member G. Furthermore, by providing, in the tire producing apparatus 1, means for switching and supplying a plurality of types of tire constituting members G, it is possible to reduce an area used for the tire forming process and thereby reduce the space.

Although the example where the tire constituting member G is wound around the body to be formed H and both ends are overlapped and joined has been described above, the present invention can be applied to a case where the tire constituting member G is wound around the body to be formed H, and both ends are not overlapped but pressed onto each other and are joined. In this case, the end portions are prevented from being triply overlapped in the portion where the end portions are joined, and furthermore, the joining can be accurately performed by reducing the difference in step height in the vicinity of the joining position, with the result that it is possible to effectively produce tires with high uniformity. For example, by cutting and discarding with the cutting means 20, before being wound around the body to be formed H, the joint portion J of the tire constituting member G, it is possible to prevent the members of the tire constituting member G from being overlapped and further enhance the uniformity. Here, since the member that is discarded is only portions in the vicinity of the joint portion J, it is also possible to effectively utilize members.

(Experiment for Winding the Tire Constituting Member G)

In order for the effects of the present invention to be confirmed, the tire producing apparatus 1 that has been described above was used, the tire constituting member G was actually wound around the body to be formed H and the accuracy of the winding and the like were evaluated. In the experiment, a pair of tire constituting members G (reinforcing members 93) having a width of 45 mm were individually cut into a length of 1430 mm, then they were simultaneously wound on both sides, thath is, the left and right sides of the support member 2 (forming drum) and they were overlapped and joined such that the amount of joining of both end portions thereof was 7 mm (hereinafter referred to as Example). Here, when the joint portion J was detected in the vicinity of the position where the tire constituting member G was cut, they were cut into a length of 1405 mm while excluding the joint portion J, then the front end holding attaching means 40 and the rear end holding attaching means 50 held both end portions, they were separated and pulled and thereby they were extended into a length of 1430 mm and wounded around the body to be formed H.

Consequently, even when the joint portion J was detected, the winding was performed by the same manner as in the case where the joint portion J was not detected, and no difference between the amounts of joining was found. When, in the Example, the tire constituting member G was wound ten times, the amount of joining was measured and variations were calculated, variations in the amount of joining was $\sigma=0.7$ mm. On the other hand, when the cut tire constituting member G was attached to the body to be formed while only the front end portion was being held, the body to be formed H was rotated and the tire constituting member G was wound around the body to be formed H while the rear end portion was not being held (conventional example), variations in the amount of joining was $\sigma=3.0$ mm. As described above, it has been found that, in the Example, variations in the amount of joining were significantly reduced and that the accuracy of joining was enhanced.

Although, in the Example, the tire constituting member G was automatically wound, it has been found that the end portions were prevented from being triply overlapped and that it was unnecessary to perform cutting and reworking by hand after the winding. Hence, it has been found that the discarding of the tire constituting member G caused by the cutting was unnecessary and that the winding process could be automated. Furthermore, the tire producing apparatus 1 was introduced into a fully automatic tire production system, and thus the tire production process including the step of winding the tire constituting member G described above was fully automated without requiring hand work from the forming step to the vulcanizing step and the inspection step. Moreover, when the winding using the tire producing apparatus 1 was also applied to the canvas chafer 91, it has been found that the accuracy of the joining was increased, and that a failure such as a joint open could be effectively prevented.

The results described above show that, according to the present invention, it is possible not only to wind with high accuracy, when the unvulcanized tire is formed, the tire constituting member G having the joint portion J around the body to be formed H without requiring hand work while preventing the members from being triply overlapped but also to suppress the decrease in uniformity and enhance the productivity of the production of the tire.

DESCRIPTION OF THE REFERENCE SYMBOLS

1: tire producing apparatus, 2: support member, 10: supply means, 11: stock portion, 12: festoon, 13: first transfer conveyer, 14: second transfer conveyer, 20: cutting means, 21: anvil, 22: cutter, 23: piston-cylinder mechanism, 30: winding device, 31: guide rail, 40: front end holding attaching means, 41: slider, 42: piston-cylinder mechanism, 43: suction pad, 50: rear end holding attaching means, 51: slider, 52: piston-cylinder mechanism, 53: suction pad, 60: detection means, 90: inner liner, 91: canvas chafer, 92: carcass ply, 93: reinforcing member, 94: bead, H: body to be formed, G: tire constituting member, J: joint portion

The invention claimed is:

1. A tire producing apparatus including supply means that supplies a tire constituting member having one or more joint portions along a longitudinal direction and rotating means of a body to be formed, for forming an unvulcanized tire by winding the tire constituting member around the rotating body to be formed, the apparatus comprising:
   front end holding attaching means as pulling-out means that pulls out the tire constituting member from a stock portion;
   detection means that detects the joint portions of the tire constituting member;
   cutting means that cuts the tire constituting member having being pulled out by the front end holding attaching means;
   a control device that:
      controls displacement of the front end holding attaching means so as to allow the tire constituting member to be cut, by the cutting means, into a length shorter than a normal wound length wound around the body to be formed while excluding the joint portion, upon detection of one of the joint portions in a vicinity of a cutting portion by the detection means; and
      controls displacement of the front end holding attaching means so as to allow the tire constituting member to be cut, by the cutting means, into the normal wound length when none of the joint portions in the vicinity of the cutting portion are detected by the detection means;
   extension means that extends, into the wound length, the tire constituting member which has been cut into the short length;
   the front end holding attaching means and rear end holding attaching means that respectively hold and attach a front end portion and a rear end portion of the wound tire constituting member to the body to be formed; and
   movement means that moves the rear end holding attaching means holding the rear end portion of the tire constituting member toward the body to be formed up to a position where the rear end portion is attached as the tire constituting member having the front end portion attached to the body to be formed is wound around the body to be formed, wherein the extension means extends the tire constituting member into the wound length by relatively increasing a rotational circumferential speed of the body to be formed with respect to a movement speed of the rear end holding attaching means when winding the tire constituting member which has been cut into the short length around the body to be formed.

2. The tire producing apparatus according to claim 1,
wherein the tire constituting member has the joint portion which inclines against a width direction, and the cutting means cuts the tire constituting member while inclining it in the same direction as the joint portion.

3. A tire producing apparatus including supply means that supplies a tire constituting member having one or more joint portions along a longitudinal direction and rotating means of a body to be formed, for forming an unvulcanized tire by winding the tire constituting member around the rotating body to be formed, the apparatus comprising:
    front end holding attaching means as pulling-out means that pulls out the tire constituting member from a stock portion;
    detection means that detects the joint portions of the tire constituting member;
    cutting means that cuts the tire constituting member having being pulled out by the front end holding attaching means;
    a control device that:
        controls displacement of the front end holding attaching means so as to allow the tire constituting member to be cut, by the cutting means, into a length shorter than a normal wound length wound around the body to be formed while excluding the joint portion, upon detection of one of the joint portions in a vicinity of a cutting portion by the detection means; and
        controls displacement of the front end holding attaching means so as to allow the tire constituting member to be cut, by the cutting means, into the normal wound length when none of the joint portions in the vicinity of the cutting portion are detected by the detection means;
    extension means that extends, into the wound length, the tire constituting member which has been cut into the short length;
    the front end holding attaching means and rear end holding attaching means that respectively hold and attach a front end portion and a rear end portion of the wound tire constituting member to the body to be formed; and
    movement means that moves the rear end holding attaching means holding the rear end portion of the tire constituting member toward the body to be formed up to a position where the rear end portion is attached as the tire constituting member having the front end portion attached to the body to be formed is wound around the body to be formed,
    wherein the extension means extends the tire constituting member into the wound length by separating, before winding the tire constituting member around the body to be formed, the front end holding attaching means and the rear end holding attaching means holding the end portions of the tire constituting member which has been cut into the short length and by extending the tire constituting member.

4. The tire producing apparatus according to claim 3,
wherein the tire constituting member has the joint portion which inclines against a width direction, and the cutting means cuts the tire constituting member while inclining it in the same direction as the joint portion.

* * * * *